United States Patent
Emord et al.

(10) Patent No.: US 9,655,151 B2
(45) Date of Patent: May 16, 2017

(54) WIRELESS MESH NETWORK AUTO-FORMING IN A MULTI-TENANT ENVIRONMENT

(71) Applicant: Adtran, Inc., Huntsville, AL (US)

(72) Inventors: Jonathan Emord, Boston, MA (US);
Sean A. McIntyre, Woburn, MA (US);
Thomas F. Guevin, Nashua, NH (US)

(73) Assignee: Adtran, Inc., Huntsville, AL (US)

( * ) Notice: Subject to any disclaimer, the term of this patent is extended or adjusted under 35 U.S.C. 154(b) by 320 days.

(21) Appl. No.: 14/506,828

(22) Filed: Oct. 6, 2014

(65) Prior Publication Data

US 2016/0100440 A1    Apr. 7, 2016

(51) Int. Cl.
*H04W 76/02* (2009.01)
*H04W 48/20* (2009.01)
*H04W 24/02* (2009.01)
*H04W 84/18* (2009.01)
*H04W 88/08* (2009.01)
*H04W 84/12* (2009.01)

(52) U.S. Cl.
CPC ......... *H04W 76/021* (2013.01); *H04W 24/02* (2013.01); *H04W 48/20* (2013.01); *H04W 84/12* (2013.01); *H04W 84/18* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2006/0111097 A1* | 5/2006 | Fujii | ............ | H04L 63/08 455/420 |
| 2007/0091861 A1* | 4/2007 | Gupta | ............ | H04L 12/24 370/338 |
| 2007/0250713 A1* | 10/2007 | Rahman | ............ | H04L 63/162 713/171 |
| 2008/0112363 A1* | 5/2008 | Rahman | ............ | H04W 8/005 370/331 |
| 2009/0137228 A1* | 5/2009 | Horn | ............ | H04W 48/02 455/411 |
| 2010/0309815 A1* | 12/2010 | Yepez | ............ | H04L 12/4625 370/254 |
| 2013/0188628 A1* | 7/2013 | Lee | ............ | H04W 48/14 370/338 |

(Continued)

*Primary Examiner* — Peter Chau
(74) *Attorney, Agent, or Firm* — Smith Tempel Blaha LLC; Michael J. Tempel

(57) ABSTRACT

A wireless mesh access point (AP) determines a candidate set of Basic Service Set Identifiers (BSSIDs) or other unique identifiers by monitoring for detection of a set of wireless communications, each bearing a unique identifier. The AP selects a candidate unique identifier from the candidate set. The AP establishes a wireless communication link with a controller of a wireless mesh network associated with the candidate unique identifier. The AP transmits a request to the controller to join the wireless mesh network associated with the candidate unique identifier. The AP receives a response from the controller indicating either acceptance or rejection of the request. If the response indicates rejection, the AP rejects one or more unique identifiers in the candidate set in response to reason information included in the rejection.

20 Claims, 4 Drawing Sheets

(56) References Cited

U.S. PATENT DOCUMENTS

| | | | |
|---|---|---|---|
| 2014/0062657 A1* | 3/2014 | Adachi | G07C 9/00007 340/5.64 |
| 2014/0079022 A1* | 3/2014 | Wang | H04W 36/22 370/331 |
| 2014/0250509 A1* | 9/2014 | Ansley | H04L 63/083 726/6 |
| 2015/0350875 A1* | 12/2015 | Chhabra | H04W 36/0083 455/432.1 |

* cited by examiner

WIRELESS MESH NETWORK AUTO-FORMING IN A MULTI-TENANT ENVIRONMENT

BACKGROUND

A wireless network is a digital communications network that allows a wireless network device to communicate with or access a computer network via a radio communication link. For a number of years, the most common type of wireless network has been that which is commonly referred to as "WiFi" or "802.11," the latter term in reference to the IEEE 802.11 set of standards that govern such networks. Such an 802.11 network comprises one or more access points (APs) that are each connected by a wired connection with a router or similar networking device. The router or other such networking device allows a client device, such as a portable computer, smartphone, etc., to communicate with or access a computer network. It is common for the networking device to provide the client device with a connection to the Internet.

In public areas, such as airports, shopping malls, multi-unit buildings, etc., such a networking device may have more than one tenant. The term "controller" is used herein to refer to such a multi-tenant networking device. The term "tenant" in this context refers to a system that controls a wireless mesh network in an environment in which two or more such wireless mesh networks share the same controller.

A wireless mesh network is a digital communications network comprising APs organized in a mesh topology, where each AP can communicate via radio communication links in a peer-to-peer manner with other such APs in the network. Each AP can receive a message from another (peer) AP and forward or relay the message to still another (peer) AP. The message reaches its ultimate destination via one or more such relays or "hops" as they are commonly referred to in the art. In a client-server computing system, the source and destination of a message is generally a client device or a server device. Wireless mesh networks provide numerous benefits over other types of wireless networks, including redundancy. For example, if a wireless mesh AP is removed from operation in the network, it may still be possible for messages that would have been routed via that AP to reach their destinations via alternative routes. A route through the wireless mesh network between an AP and the controller via one or more hops can be referred to as an uplink. Wireless mesh networks can employ radio technology and protocols that are similar to those employed in non-mesh wireless networks, such as those governed by IEEE 802.11. A set of standards known as IEEE 802.11s relates more specifically to wireless mesh networks and is an extension of the IEEE 802.11 set of standards.

A subset of wireless mesh APs in a network may also be wireless mesh portal APs. A wireless mesh portal AP not only can communicate via wireless communication links with peers but also can communicate via a wired connection with, for example, the controller. The controller can serve as a gateway to a computer network, such as the Internet.

To install a wireless mesh network, a system administrator or similar person (referred to herein for convenience as a "user") commonly first determines the network topology, i.e., the spatial positions in which each wireless mesh AP is to be placed relative to its peers. The user then configures each wireless mesh AP with information that enables it to connect to the wireless mesh network. For example, each wireless mesh AP must be provided with the service set identifier (SSID) of the wireless mesh network. The user then plugs the one or more wireless mesh APs that are portals into a wired network, and positions the remaining wireless mesh APs.

The above-described method for installing a wireless mesh network requires that the user possess substantial technical knowledge of wireless mesh networking and provide substantial physical interaction with the wireless mesh APs. It would be desirable to provide a system and method in which less interaction with the user is required to form or install a wireless mesh network.

SUMMARY

Embodiments of the invention relate to a system, method, and computer program product for operation of a wireless mesh access point in a manner that enables the wireless mesh access point to join a wireless mesh network. In an exemplary embodiment, the wireless mesh access point determines a candidate set of one or more unique identifiers by monitoring for detection of a set of one or more wireless communications, each bearing a unique identifier. The wireless mesh access point then selects a candidate unique identifier from the candidate set. The wireless mesh access point establishes a wireless communication link with a controller of a wireless mesh network associated with the candidate unique identifier. Then, the wireless mesh access point transmits a request to the controller to join the wireless mesh network associated with the candidate unique identifier. The wireless mesh access point receives a response from the controller indicating either acceptance of the request or a rejection of the request. In an instance in which the response includes a rejection of the request, the rejection of the request includes reason information. If the response includes a rejection, the wireless mesh access point rejects one or more unique identifiers in the candidate set of one or more unique identifiers in response to the reason information included in a rejection of the request. The wireless mesh access point then selects another candidate unique identifier from among the remaining unique identifiers in the candidate set and repeats the foregoing method.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
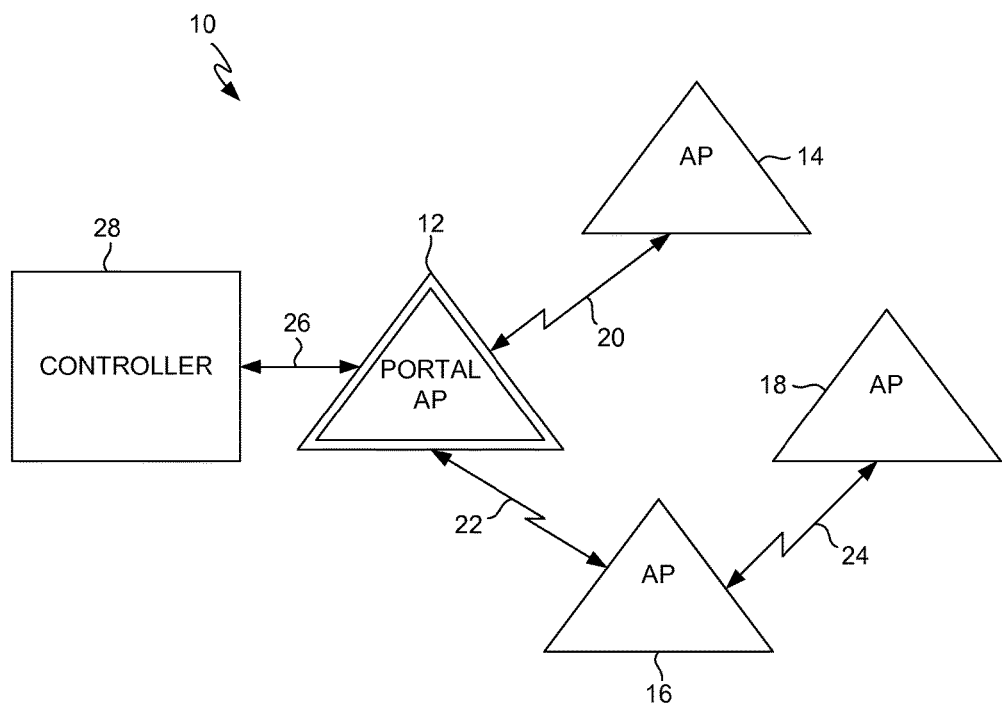
FIG. 1 is a block diagram of an exemplary wireless mesh network.

As illustrated in FIG. 1, in an illustrative or exemplary embodiment of the invention, a wireless mesh network 10 includes a plurality of wireless mesh access points (APs) 12, 14, 16, 18, etc. Although for illustrative purposes only these four exemplary APs 12-18 are shown, wireless mesh network 10 can have any number of such wireless mesh APs. As well understood by persons skilled in the art, the exemplary APs 12-18 are arranged in a mesh topology. That is, each of APs 12-18, when properly configured, can communicate via a wireless communication link with at least one other of APs 12-18. Whether a particular one of APs 12-18 can establish a wireless communication link with another particular one other of APs 12-18 depends upon whether they are within radio reception range of each other and how they are configured. The spatial arrangement of APs 12-18 shown in FIG. 1 is intended merely to be illustrative, as each of APs 12-18 can be located in any suitable position relative to the others. Those of APs 12-18 that can establish wireless communication links with each other are referred to as peers. For example: AP 12 and AP 14 are peers because they can establish and communicate with each other via a wireless communication link 20; AP 12 and AP 16 are peers because they can establish and communicate with each other via a wireless communication link 22; and AP 16 and AP 18 are peers because they can establish and communicate with each other via a wireless communication link 24.

While APs 12-18 can only communicate with each other via wireless communication links 20-24, AP 12 can also communicate via a wired communication link 26 because it is a wireless mesh portal AP. In the exemplary embodiment, wired communication link 26 connects AP 12 with a controller 28. Controller 28 serves as a gateway connecting wireless mesh network 10 to one or more other networks (not shown), such as the Internet.

Although only wireless mesh network 10 is shown for purposes of clarity, it should be understood that other such wireless mesh networks may be present in proximity to wireless mesh network 10. Each such other wireless mesh network may include a controller similar to controller 28 and one or more APs similar to APs 12-18. It should also be understood that controller 28 or the controllers of other wireless mesh networks in proximity to wireless mesh network 10 may host multiple tenants. That is, controller 28 may control additional APs (not shown for purposes of clarity) other than the illustrated APs 12-18.

Figure 2A:
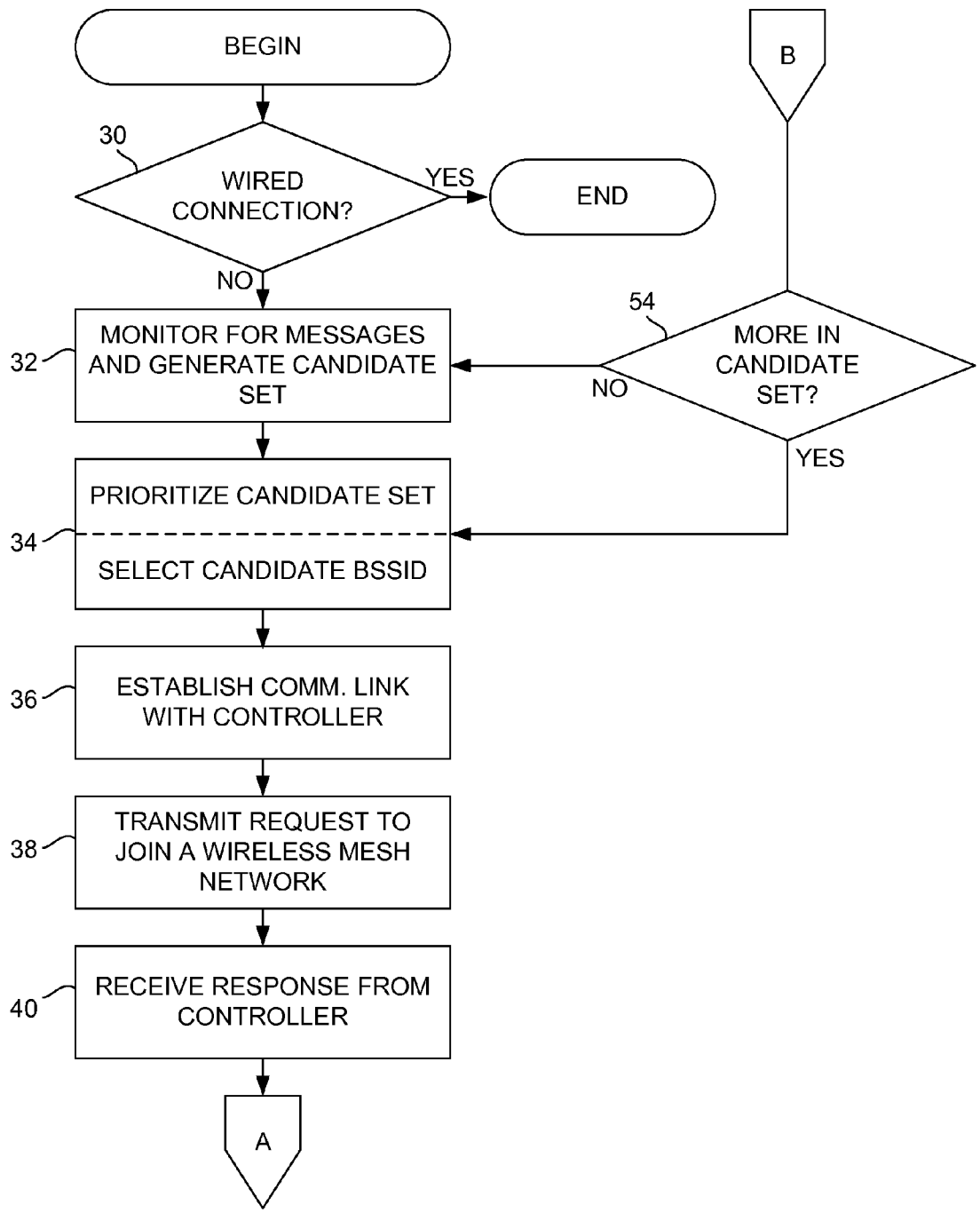
FIG. 2A is a flow diagram illustrating an exemplary method of operation of an exemplary wireless mesh access point in the wireless mesh network of FIG. 1.
Figure 2B:
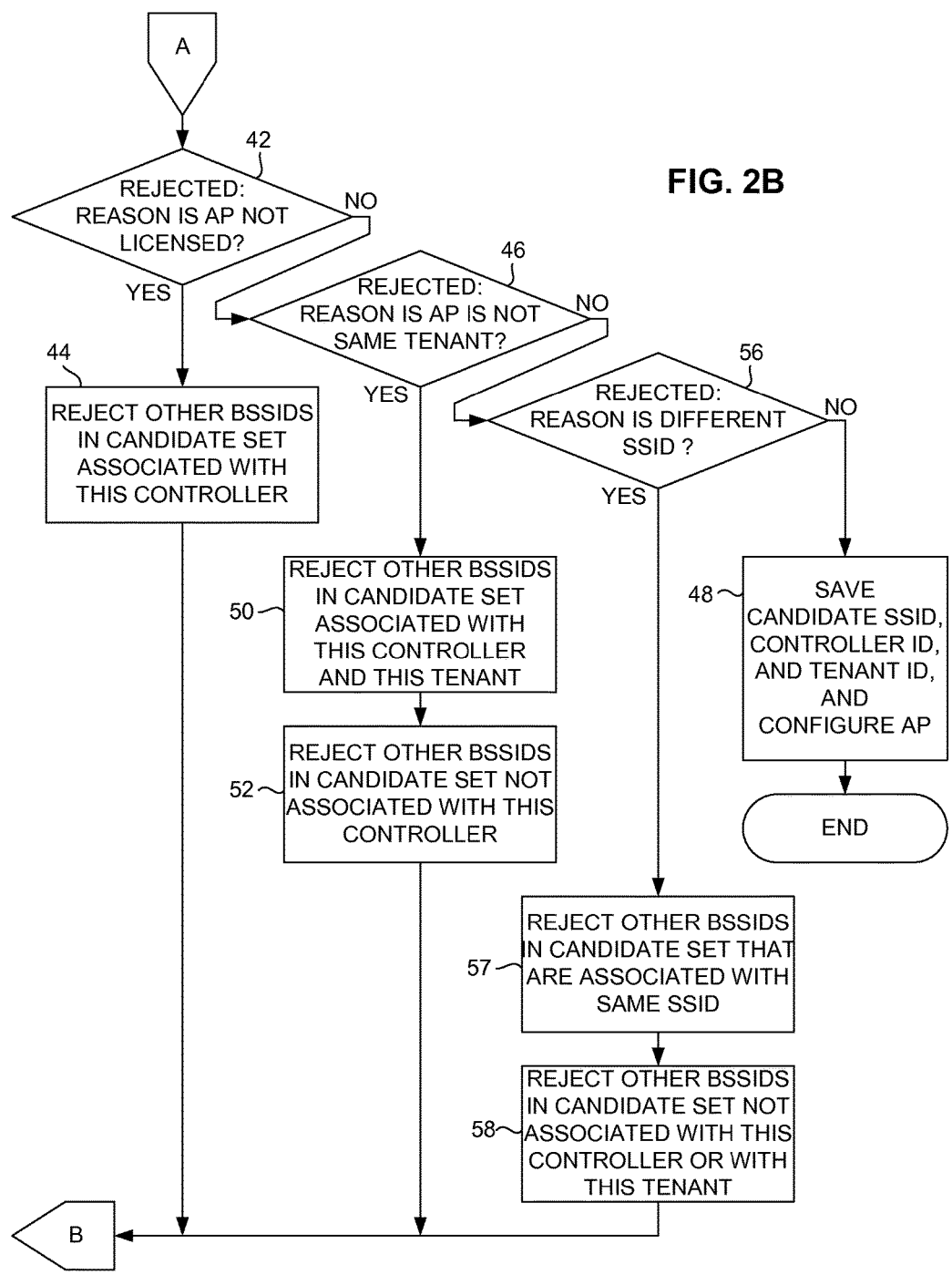
FIG. 2B is a continuation of the flow diagram of FIG. 2A.

The flow diagram of FIGS. 2A-2B illustrates an exemplary method by which each of APs 12-18 can operate in network 10. As described below, in the exemplary embodiment the method can occur when any one of APs 12-18 is newly installed in position in network 10 and power is applied to it. For convenience, the description below refers to the newly installed one of APs 12-18 as an "exemplary AP" 60 (described in further detail below with regard to FIG. 3). A goal of the method is for the exemplary AP 60 to determine the information needed to properly establish an uplink with controller 28. Such information includes a Basic Service Set Identifier (BSSID) as well as controller and tenant information. As described in further detail below, criteria for selecting a BSSID can include, for example, whether a BSSID is associated with a license for the exemplary AP 60, and whether a BSSID is associated with the same tenant as the exemplary AP 60.

The selected BSSID will uniquely identify an AP through which exemplary AP 60 can establish an uplink with controller 28, as a BSSID is formed in part from an AP's unique Media Access Control (MAC) address. In an instance in which an AP has more than one radio transceiver, the AP can have a BSSID for each transceiver. In contrast with a BSSID, an SSID does not uniquely identify an AP but rather identifies a network from the perspective of users, i.e., a "user network." An SSID may be colloquially referred to as "the name of the network" and is commonly a human-readable string. In some instances, a wireless mesh network can support more than one user network. For example, a network operated on the premises of a business may support a first network named "BUSINESS" for use by employees of the business and a second network named "GUEST" for use by visitors to the premises. In an instance in which a wireless mesh network supports only one user network, all APs in the network have the same SSID, but each AP in the network has a unique BSSID. Both a BSSID and an SSID are "unique identifiers" as that term is used herein.

As indicated by block 30, the exemplary AP 60 first determines whether it is connected to controller 28 (or any other such controller) via a wired communication link, i.e., determines whether it is a portal AP. If the exemplary AP 60 determines that it is not connected via a wired communication link, then the exemplary AP 60 begins the process of selecting a BSSID. If the exemplary AP 60 is connected via a wired communication link to a controller, then it does not need to select a BSSID using the method described herein, as the controller can provide a BSSID in a conventional manner similar to a non-mesh wireless network.

As indicated by block 32, the exemplary AP 60 scans or monitors wireless communications or transmissions on all channels and across all regulatory domains. Such communications may include those transmitted by other APs 12-18 other than the exemplary AP 60; those transmitted by other APs (not shown) of wireless mesh networks other than wireless mesh network 10 and controlled by controllers other than controller 28; and those transmitted by still other APs (not shown) of other tenants of controller 28. In the exemplary embodiment, the beacon signal transmitted by each of APs 12-18 (as well as any other APs that may be in proximity) includes the following items of information: information uniquely identifying the controller 28 associated with the transmitting AP; information uniquely identifying the tenant associated with the transmitting AP; the number of hops between the transmitting AP and an associated wireless mesh portal AP; and the number of APs existing in the transmitting AP's wireless mesh network at the time of the transmission.

By scanning or monitoring for beacon signals transmitted by other APs, the exemplary AP 60 can collect the above-listed information items for each detected beacon signal. The exemplary AP 60 also collects the SSID and BSSID included in each detected beacon signal. The information items collected from all detected beacon signals form a candidate set. The candidate set thus includes the SSID of each detected beacon signal and the other items of information associated with each BSSID.

As indicated by block 34, the exemplary AP 60 then selects a candidate BSSID from the candidate set. The exemplary AP 60 can prioritize the selection by determining a priority of each candidate BSSID in the candidate set. For example, the exemplary AP 60 can maintain the candidate set in the form of a list ordered by priority. A priority can be computed in response to inputs such as radio signal strength, the above-described number of hops the above-described number of APs in the wireless mesh network, etc. For example:

$$PRIORITY = 2*RSSI - (H/10)*RSSI - (NU/1000)*RSSI,$$

where PRIORITY is a numerical value indicating priority, RSSI is a measurement of the beacon (transmission) signal strength above a noise floor, H is the number of hops, and NU is the number of APs in the wireless mesh network associated with the transmission.

Note that the candidate BSSID is associated with the AP transmission from which the BSSID was collected. For purposes of clarity and convenience, that AP also can be referred to herein as the candidate AP. The candidate AP, i.e., an AP operating in accordance with the candidate BSSID, may or may not be a peer of the exemplary AP 60 (operating in accordance with its own BSSID). Note that the candidate AP and exemplary AP 60 are peers in an instance in which the candidate AP and the exemplary AP 60 are: (a) controlled by the same controller as each other; (b) are in the same domain as each other (i.e., both the candidate AP and exemplary AP 60 are controlled by the same tenant as each other); and (c) are operating in the same user network (i.e., SSID) as each other. It is possible, however, that in some instances the candidate AP and exemplary AP 60 are, are controlled by different controllers or tenants from each other, or are operating in different user networks from each other. A goal of the method is to select a BSSID associated with a candidate AP that is a peer of the exemplary AP 60.

As indicated by block 36, the exemplary AP 60 then establishes a wireless communication link or uplink with a controller. The controller with which the exemplary AP 60 establishes a communication link may be controller 28 of wireless mesh network 10 or some other controller (not shown for purposes of clarity). It should be understood that the exemplary AP 60 does not have the ability to select or identify the controller with which it establishes an uplink, as this depends upon the identity of the candidate AP. The candidate AP forwards, via its peers, communications received from the exemplary AP to the controller that controls the candidate AP. Note that in a multi-tenant environment the uplink is associated with one of the tenants of the controller. It should be understood that the exemplary AP 60 does not have the ability to select or identify the tenant associated with the uplink, as this too depends upon the identity of the candidate AP. Similarly, note that in a multi-SSID environment the uplink is associated with one of the SSIDs. The exemplary AP 60 does not have the ability to select or identify the SSID associated with the uplink, as this likewise depends upon the identity of the candidate AP. The candidate AP forwards, via its peers, communications received from the exemplary AP to the tenant that controls the candidate AP.

As indicated by block 38, the exemplary AP 60 transmits a request to the controller to join the wireless mesh network associated with the candidate SSID. As indicated by block 40, the exemplary AP 60 receives a response from the controller indicating either that the controller accepted the request or that the controller rejected the request. In an instance in which the response is a rejection, the response includes reason information indicating one or more reasons why the request was rejected. As described below, the exemplary AP 60 uses the reason information to remove or thin candidate BSSIDs from the candidate set.

As indicated by block 42, the exemplary AP 60 determines whether the reason information indicates that the exemplary AP 60 is not associated with a license or authorization permitting the controller to control the exemplary AP 60. (Note that the controller can identify the exemplary AP 60 by its media access control (MAC) address.) If the exemplary AP 60 determines (block 42) that the reason information indicates the exemplary AP 60 is not associated with such a license or authorization, then the exemplary AP 60 rejects not only the candidate BSSID but also thins the candidate set by rejecting all other BSSIDs in the candidate set that are associated with that same controller, as indicated by block 44.

However, if the exemplary AP 60 determines that the reason information indicates the exemplary AP 60 is associated with such a license or authorization, then the exemplary AP 60 determines whether the reason information indicates the exemplary AP 60 is not associated with a tenant associated with the controller, as indicated by block 46. Note that the uplink or route through the wireless mesh network between the exemplary AP 60 and the controller may be associated with a certain tenant in a multi-tenant environment.

If the exemplary AP 60 determines (block 46) that the reason information indicates the exemplary AP 60 is not associated with a tenant associated with the controller, then the exemplary AP 60 not only rejects the candidate BSSID but also thins the candidate set by rejecting all other BSSIDs in the candidate set that are associated with both that controller and that tenant associated with that controller, as indicated by block 50. Note that an instance in which the exemplary AP 60 is not associated with a tenant associated with the controller indicates that the exemplary AP 60 has established an uplink with a proper controller but with an improper tenant of that controller. Therefore, the exemplary AP 60 also rejects all other BSSIDs in the candidate set associated with a controller other than the controller with which the exemplary AP 60 has established the communication link using the candidate BSSID, as indicated by block 52.

If the exemplary AP 60 determines (block 46) that the reason information does not indicate the candidate BSSID is not associated with a tenant associated with the controller, then the exemplary AP 60 determines whether the reason information indicates the candidate BSSID is not associated with an SSID associated with the controller, as indicated by block 56. If the exemplary AP 60 determines that the reason information indicates the candidate BSSID is not associated with the controller, then the exemplary AP 60 not only rejects the candidate BSSID but also thins the candidate set by rejecting other BSSIDs in the candidate set that are associated with the same SSID as the candidate BSSID, as indicated by block 57. In addition, as indicated by block 58, in such an instance the exemplary AP also rejects other BSSIDs in the candidate set associated either with a controller other than the controller with which the exemplary AP 60 has established the communication link using the candidate BSSID or with a tenant other than the tenant with which the exemplary AP has established the communication link using the candidate BSSID.

However, if the exemplary AP 60 determines (block 56) that the reason information does not indicate that the candidate BSSID is not associated with an SSID associated with the controller, then the exemplary AP 60 has achieved the goal of identifying a BSSID with which it can communicate in an authorized and otherwise proper manner. In other words, the exemplary AP has established a communication link characterized by: (a) a controller that deems the exemplary AP 60 to have a license permitting the controller to control the exemplary AP 60; (b) a tenant associated with the exemplary AP 60; and (c) a user network (SSID) associated with the exemplary AP 60. Accordingly, as indicated by block 48, the exemplary AP 60 saves this candidate BSSID as well as information identifying the controller and tenant, and configures itself to use the saved BSSID in further communications. The method is effectively completed.

Following blocks 44, 52 and 58, as indicated by block 54, the exemplary AP 60 then determines whether all candidate BSSIDs in the candidate set have been subjected to the selection testing described above with regard to block 36-52. If the exemplary AP 60 determines that all candidate BSSIDs in the candidate set have not yet been tested, i.e., there are more BSSIDs in the candidate set, then the method continues as described above with regard to block 34, such that the next highest priority BSSID in the candidate set is selected next. If the exemplary AP 60 determines that all candidate BSSIDs in the candidate set have been tested, i.e., there are no more BSSIDs in the candidate set, then the method continues as described above with regard to block 32. Even once a suitable BSSID has been identified, the exemplary AP 60 can continue to collect and maintain the candidate set for use in the event that the exemplary AP 60 is relocated or otherwise later needs to select another suitable BSSID.

It should be understood that the method described above is not intended to represent the entirety of the operation of each of APs 12-18, network 10 or any portion thereof. Rather, the method described above represents only those operational aspects that are most directly related to the exemplary embodiment of the invention. Other operational aspects of each of APs 12-18, such as those that are conventional, may not be described herein, as they are well understood by persons skilled in the art. Except as otherwise stated herein, each of APs 12-18 operates not only in the manner described above but also in a conventional manner. Thus, for example, each of APs 12-18 is configured to establish and communicate via wireless communication links with client devices (not shown).

Figure 3:
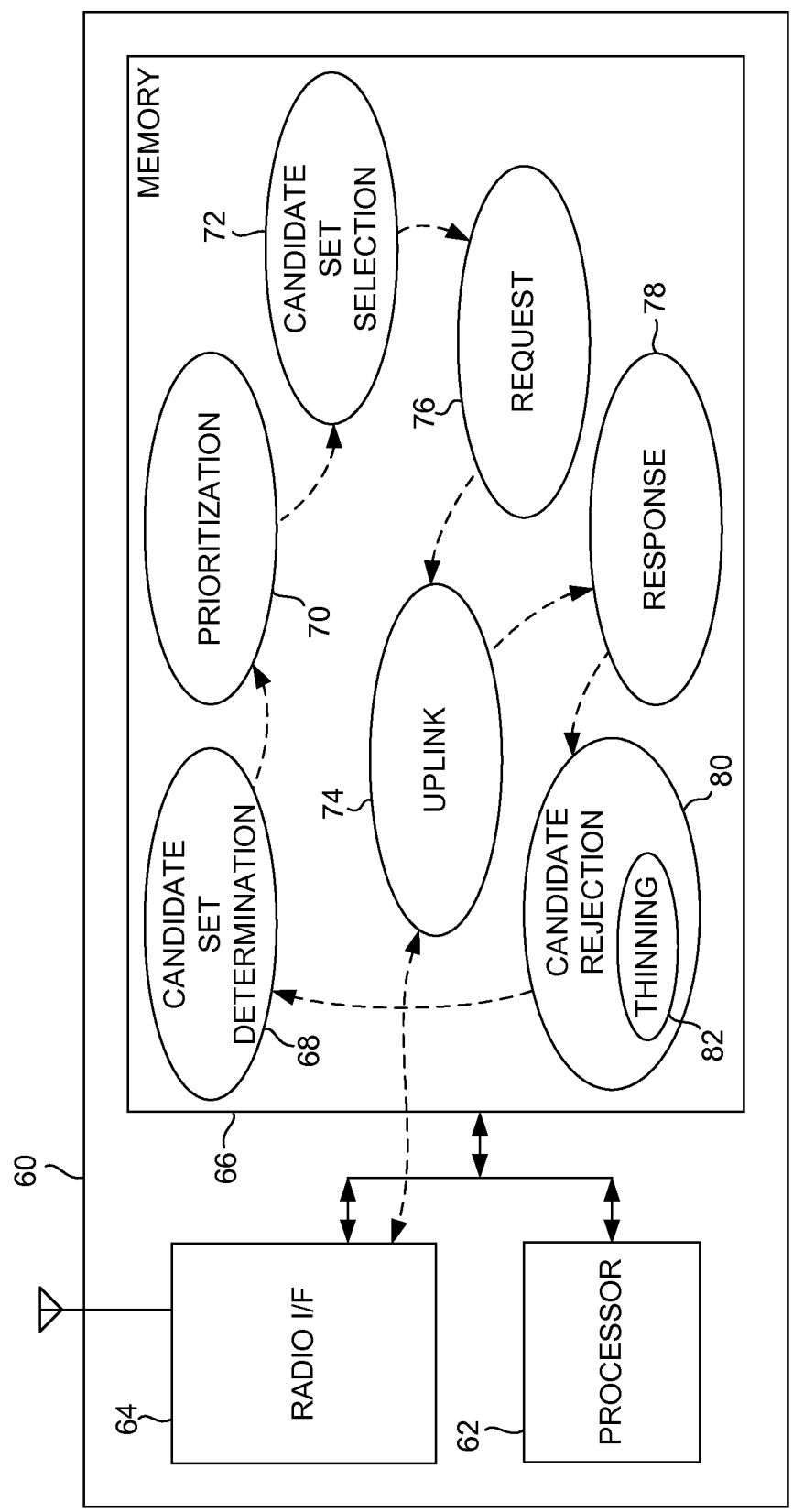
FIG. 3 is a block diagram of an exemplary wireless mesh access point of the wireless mesh network of FIG. 1.

As illustrated in FIG. 3, the exemplary AP 60 can include a processor 62, a radio interface 64, and a memory 66. In addition to these elements, AP 60 can include any other suitable elements commonly included in conventional wireless mesh access points. However, as the above-referenced elements are most directly related to the operation of the exemplary embodiment of the invention, only these elements are shown and described herein for purposes of clarity. Conventional elements, including some conventional logic, of AP 60 are not shown or described herein, as they are well understood by persons skilled in the art. As well understood in the art, radio interface 64, under control of processor 62, is configured to establish the above-referenced wireless communication links.

AP 60 includes the following logic elements: candidate set determination logic 68, prioritization logic 70, candidate set selection logic 72, uplink logic 74, request logic 76, response logic 78, and candidate rejection logic 80. Candidate rejection logic 80 includes thinning logic 82. Although the foregoing logic elements are shown in FIG. 3 in a conceptual manner as stored in or residing in memory 66, persons skilled in the art understand that such logic elements arise through the operation of processor 62 and may not be present simultaneously or in their entireties in memory 66. Such software or firmware contributes to programming or configuring the processing system, comprising processor 62 and memory 66, with such logic elements. Although memory 66 is depicted as a single or unitary element, memory 66 can be of any suitable type and can have any suitable structure, such as one or more modules, chips, etc. Memory 66 can be, for example, a non-volatile type such as flash memory. Such software or firmware can be stored or otherwise embodied in any suitable non-transitory medium, including any suitable type of memory, and operated upon in memory 66 or other data storage medium in accordance with well-known computing principles. Such software or firmware can be loaded into memory 66 or other memory (not shown) in any suitable manner, such as during a configuration procedure preceding the method of operation described above. The broken-line arrows in FIG. 3 conceptually represent some of the communication of information that occurs among some of the logic elements of AP 60.

It should be understood that the combination of memory 66 and the above-referenced logic elements or software, firmware, instructions, etc., underlying the logic elements, as stored in memory 66 in non-transitory computer-readable form, defines a "computer program product" as that term is understood in the patent lexicon. In view of the descriptions herein, persons skilled in the art will readily be capable of providing suitable software or firmware or otherwise configuring AP 60 to operate in the manner described. Also, although the effect of each of the above-referenced logic elements is described herein, it should be understood that the effect may result from contributions of two or more logic elements, or from contributions of the logic elements and conventional wireless mesh access point logic elements or other network features that are not shown for purposes of clarity.

Candidate set determination logic 68 contributes to the configuring of AP 60 to determine a candidate set of BSSIDs by monitoring for detection of a set of one or more wireless communications. Prioritization logic 70 contributes to the configuring of AP 60 to assign a priority to each BSSID in the candidate set. Candidate set selection logic 72 contributes to the configuring of AP 60 to select a candidate BSSID from the candidate set. Uplink logic 74 contributes to the configuring of AP 60 to establish an uplink with a controller of a wireless mesh network associated with the candidate unique identifier. Uplink logic 74 also contributes to the figuring of AP 60 to determine whether a wired network connection exists and to establish an uplink via such a wired connection. Request logic 76 contributes to the configuring of AP 60 to transmit a request to the controller to join the wireless mesh network associated with the candidate BSSID. Response logic 78 contributes to the configuring of AP 60 to receive a response from the controller indicating either an acceptance or a rejection of the request. Candidate rejection logic 80 contributes to the configuring of AP 60 to reject one or more BSSIDs in the candidate set based on the reason information included in a rejection. Thinning logic 82 contributes to the configuring of AP 60 to use the reason information to intelligently thin the candidate set in a manner that rejects as many unsuitable BSSIDs as can be identified as early in the process as possible.

It should be understood that although for purposes of clarity the exemplary method, system and computer program product are described above with regard to an exemplary one of APs 12-18, the same descriptions apply to each of APs 12-18. Thus, wireless network 10 can be formed by placing and otherwise installing each of APs 12-18 in the manner described above.

One or more illustrative or exemplary embodiments of the invention have been described above. However, it is to be understood that the invention is defined by the appended claims and is not limited to the specific embodiments described.

What is claimed is:

1. A method for operation of a wireless mesh access point, comprising:

determining, by the wireless mesh access point, a candidate set of unique identifiers by monitoring for detection of a set of one or more wireless communications, each bearing a unique identifier;

selecting, by the wireless mesh access point, a candidate unique identifier from the candidate set;

establishing, by the wireless mesh access point, a wireless communication link with a controller of a wireless mesh network associated with the candidate unique identifier;

transmitting, by the wireless mesh access point, a request to the controller to join the wireless mesh network associated with the candidate unique identifier;

receiving, by the wireless mesh access point, a response from the controller indicating one of an acceptance of the request and a rejection of the request, wherein when the response indicates rejection of the request the response includes reason information indicating at least one reason why the request was rejected; and when the response indicates rejection of the request, the wireless mesh access point rejecting one or more unique identifiers in the candidate set in response to an analysis of the at least one reason.

2. The method of claim 1, further comprising assigning a priority to each unique identifier in the candidate set, wherein the selecting step is performed in response to the priority assigned to each unique identifier in the candidate set.

3. The method of claim 1, further comprising:
determining whether a wired communication link exists; and
transmitting the request via the wired communication link.

4. The method of claim 1, wherein rejecting one or more unique identifiers in the candidate set comprises:
rejecting the candidate unique identifier;
determining whether the reason information indicates the wireless mesh access point is not associated with a license to be operated by the controller;
determining whether the candidate set includes one or more additional unique identifiers associated with the controller when the reason information indicates the wireless mesh access point is not associated with a license to be operated by the controller; and
rejecting the one or more additional unique identifiers associated with the controller when the candidate set includes the one or more additional unique identifiers and when the reason information indicates the wireless mesh access point is not associated with a license to be operated by the controller.

5. The method of claim 4, wherein the one or more additional unique identifiers that are rejected when the reason information indicates the wireless mesh access point is not associated with a license to be operated by the controller consist of all unique identifiers in the candidate set associated with the controller.

6. The method of claim 1, wherein rejecting one or more unique identifiers in the candidate set comprises:
rejecting the candidate unique identifier;
determining whether the reason information indicates the wireless mesh access point is not associated with a tenant associated with the controller;
determining whether the candidate set includes one or more additional unique identifiers associated with the controller when the reason information indicates the wireless mesh access point is not associated with a tenant associated with the controller; and
rejecting the one or more additional unique identifiers associated with the controller when the candidate set includes the one or more additional unique identifiers associated with the controller and the reason information indicates the wireless mesh access point is not associated with a tenant associated with the controller.

7. The method of claim 6, wherein the one or more additional unique identifiers that are rejected when the reason information indicates the wireless mesh access point is not associated with a tenant associated with the controller consist of all unique identifiers in the candidate set associated with both the controller and the tenant associated with the controller.

8. The method of claim 6, wherein the one or more additional unique identifiers that are rejected when the reason information indicates the wireless mesh access point is not associated with a tenant associated with the controller consist of all unique identifiers in the candidate set associated with another controller.

9. A wireless mesh access point, comprising:
a wireless mesh network radio interface configured to provide wireless communication in a wireless mesh network; and
a processing system of the wireless mesh access point, the processing system comprising a processor and memory, the processing system configured to include:
candidate set determination logic configured to determine a candidate set of unique identifiers by monitoring for detection of a set of one or more wireless communications, each bearing a unique identifier;
candidate selection logic configured to select a candidate unique identifier from the candidate set;
uplink logic configured to establish a wireless communication link with a controller of the wireless mesh network associated with the candidate unique identifier;
request logic configured to transmit a request to the controller to join the wireless mesh network associated with the candidate unique identifier;
response logic configured to receive a response from the controller indicating one of an acceptance of the request and a rejection of the request, wherein when the response indicates rejection of the request the response includes reason information indicating at least one reason why the request was rejected; and
candidate rejection logic configured to, when the response indicates rejection of the request, reject one or more unique identifiers in the candidate set in response to an analysis of the at least one reason.

10. The wireless mesh access point of claim 9, wherein the processing system is further configured to include prioritization logic configured to assign a priority to each unique identifier in the candidate set, wherein the candidate selection logic operates in response to the priority assigned to each unique identifier in the candidate set.

11. The wireless mesh access point of claim 9, wherein the processing system is further configured to include wired link logic configured to determine whether a wired communication link exists and to transmit the request via the wired communication link.

12. The wireless mesh access point of claim 9, wherein the candidate rejection logic is configured to reject the candidate unique identifier and further comprises candidate set thinning logic configured to determine whether the reason information indicates the wireless mesh access point is not associated with a license to be operated by the controller, to determine whether the candidate set includes one or more additional unique identifiers associated with the controller when the reason information indicates the wireless mesh access point is not associated with a license to be operated by the controller, and to reject the one or more additional unique identifiers when the candidate set includes the one or more additional unique identifiers associated with the controller and the reason information indicates the wireless mesh access point is not associated with a license to be operated by the controller.

13. The wireless mesh access point of claim 12, wherein the one or more additional unique identifiers that are rejected when the reason information indicates the wireless mesh access point is not associated with a license to be operated by the controller consist of all unique identifiers in the candidate set associated with the controller.

14. The wireless mesh access point of claim 9, wherein the candidate rejection logic is configured to reject the candidate unique identifier and further comprises candidate set thinning logic configured to determine whether the reason information indicates the wireless mesh access point is not associated with a tenant associated with the controller, to determine whether the candidate set includes one or more additional unique identifiers associated with the controller when the reason information indicates the wireless mesh access point is not associated with a tenant associated with the controller, and to reject the one or more additional unique identifiers when the candidate set includes the one or more additional unique identifiers associated with the controller and the reason information indicates the wireless mesh access point is not associated with a tenant associated with the controller.

15. The wireless mesh access point of claim 14, wherein the one or more additional unique identifiers that are rejected when the reason information indicates the wireless mesh access point is not associated with a tenant associated with the controller consist of all unique identifiers in the candidate set associated with both the controller and the tenant associated with the controller.

16. The wireless mesh access point of claim 14, wherein the one or more additional unique identifiers that are rejected when the reason information indicates the wireless mesh access point is not associated with a tenant associated with the controller consist of all unique identifiers in the candidate set associated with another controller.

17. A computer program product for operating a wireless mesh access point, the computer program product comprising a medium in non-transitory computer-readable form having stored thereon instructions that when executed by a processing system of the wireless mesh access point causes the wireless mesh access point to effectuate a method comprising:
   determining, by the wireless mesh access point, a candidate set of unique identifiers by monitoring for detection of a set of one or more wireless communications, each bearing a unique identifier;
   selecting, by the wireless mesh access point, a candidate unique identifier from the candidate set;
   establishing, by the wireless mesh access point, a wireless communication link with a controller of a wireless mesh network associated with the candidate unique identifier;
   transmitting, by the wireless mesh access point, a request to the controller to join the wireless mesh network associated with the candidate unique identifier;
   receiving, by the wireless mesh access point, a response from the controller indicating one of an acceptance of the request and a rejection of the request, wherein when the response indicates rejection of the request the response includes reason information indicating at least one reason why the request was rejected; and
   when the response indicates rejection of the request, the wireless mesh access point rejecting one or more unique identifiers in the candidate set in response to an analysis of the at least one reason.

18. The computer program product of claim 17, further comprising instructions that when executed by the processing system cause the wireless mesh access point to effectuate the method further comprising assigning a priority to each unique identifier in the candidate set, wherein the selecting step is performed in response to the priority assigned to each unique identifier in the candidate set.

19. The computer program product of claim 17, wherein rejecting one or more unique identifiers in the candidate set comprises:
   rejecting the candidate unique identifier;
   determining whether the reason information indicates the wireless mesh access point is not associated with a license to be operated by the controller;
   determining whether the candidate set includes one or more additional unique identifiers associated with the controller when the reason information indicates the wireless mesh access point is not associated with a license to be operated by the controller; and
   rejecting the one or more additional unique identifiers when the candidate set includes the one or more additional unique identifiers associated with the controller and the reason information indicates the wireless mesh access point is not associated with a license to be operated by the controller.

20. The computer program product of claim 17, wherein rejecting one or more unique identifiers in the candidate set comprises:
   rejecting the candidate unique identifier;
   determining whether the reason information indicates the wireless mesh access point is not associated with a tenant associated with the controller;
   determining whether the candidate set includes one or more additional unique identifiers associated with the controller when the reason information indicates the wireless mesh access point is not associated with a tenant associate with the controller; and
   rejecting the one or more additional unique identifiers when the candidate set includes the one or more additional unique identifiers associated with the controller and the reason information indicates the wireless mesh access point is not associated with a tenant associated with the controller.

* * * * *